No. 757,671. PATENTED APR. 19, 1904.
D. J. McMAHON.
WIRE DRAWING MACHINE.
APPLICATION FILED MAR. 4, 1903.
NO MODEL. 2 SHEETS—SHEET 1.
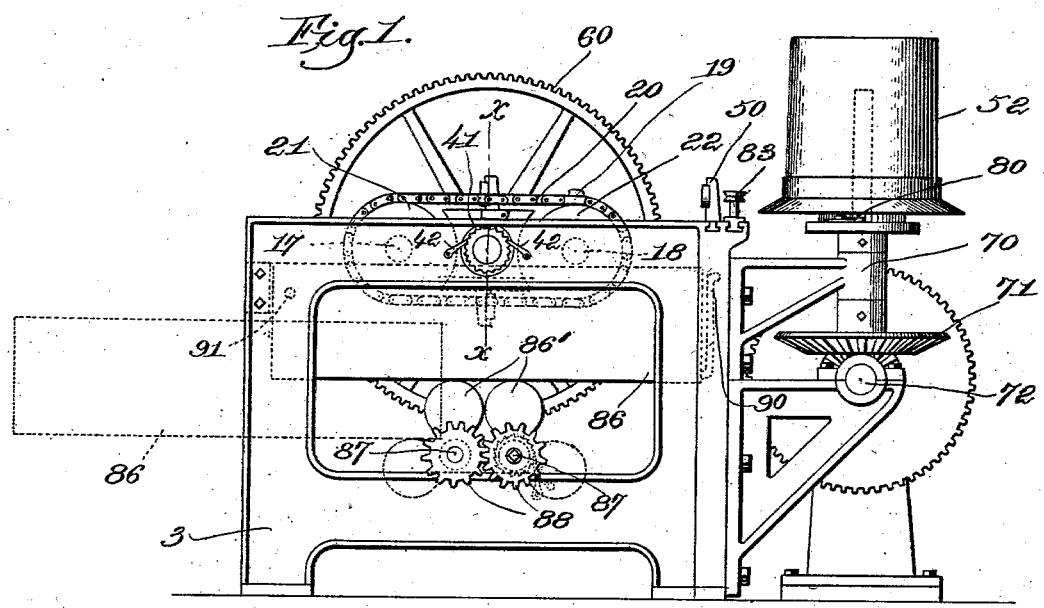
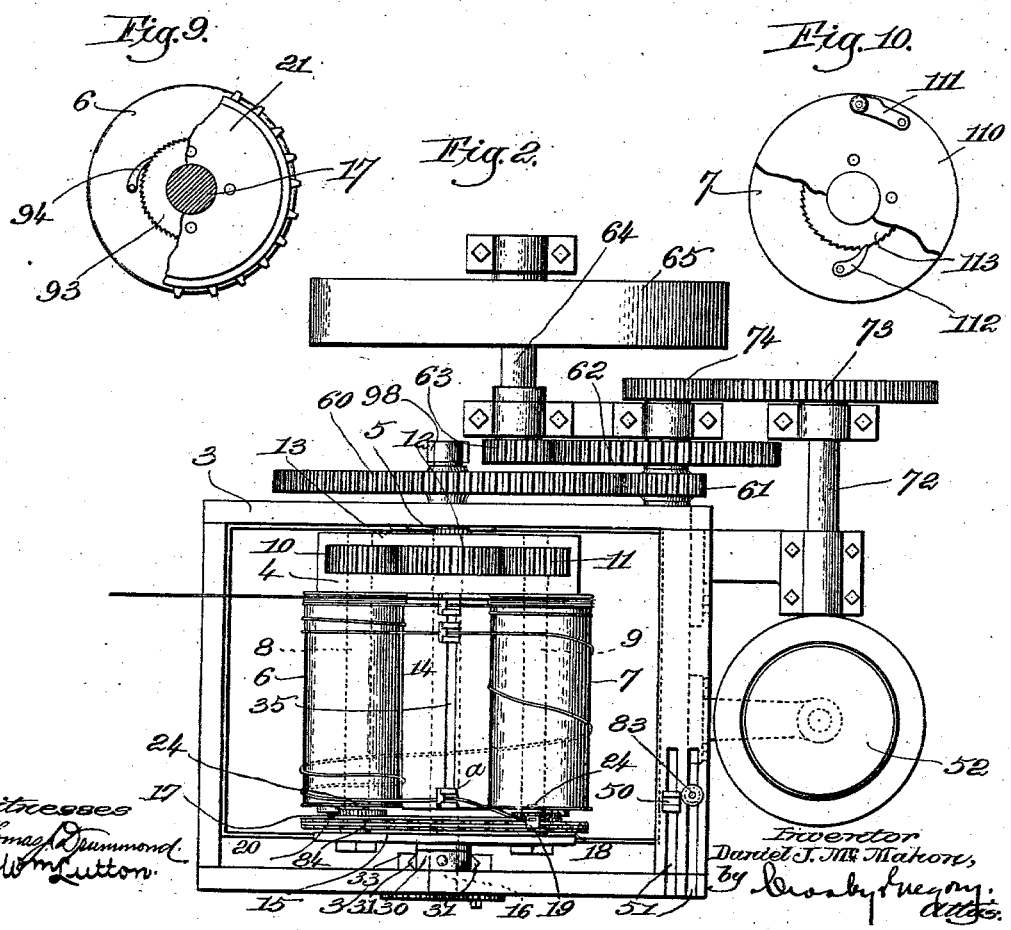

No. 757,671. PATENTED APR. 19, 1904.
D. J. McMAHON.
WIRE DRAWING MACHINE.
APPLICATION FILED MAR. 4, 1903.
NO MODEL. 2 SHEETS—SHEET 2.
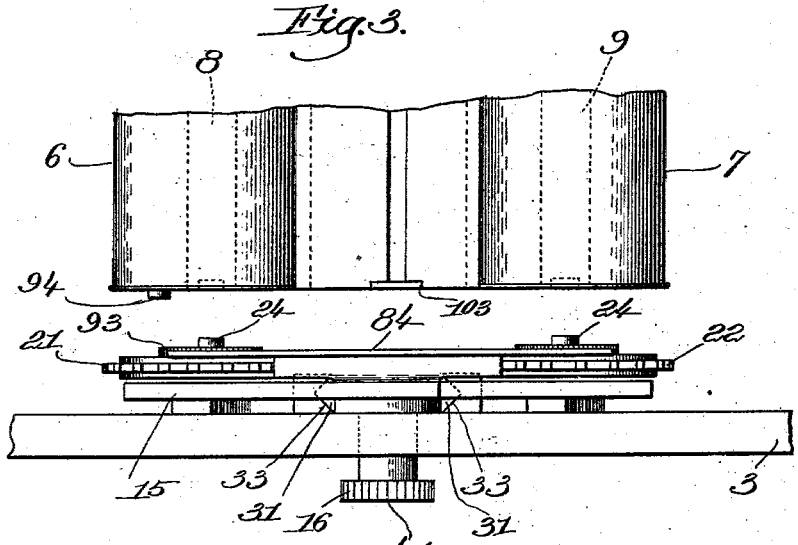
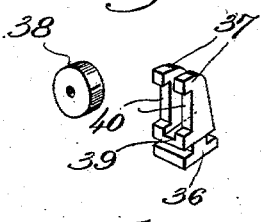
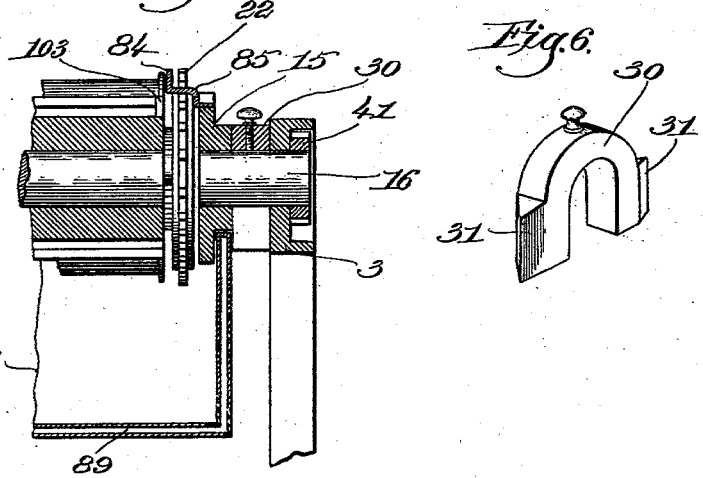
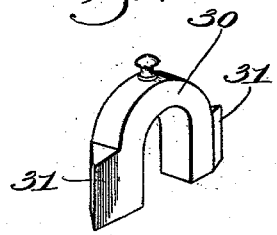
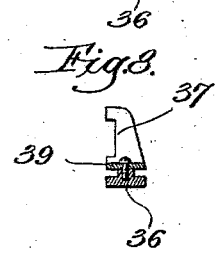
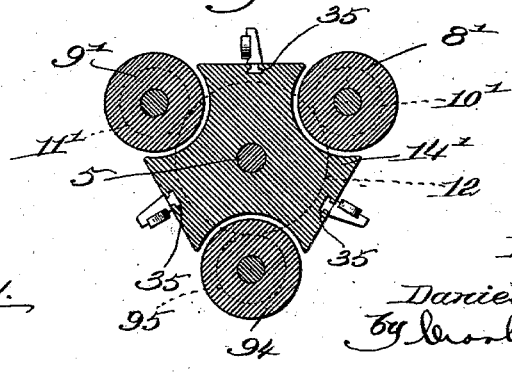
Witnesses.
Thomas J. Drummond.
S. W. Lutton.
Inventor.
Daniel J. McMahon,
by Crosby Gregory,
attys.
THE NORRIS PETERS CO., PHOTO-LITHO., WASHINGTON, D. C.

No. 757,671. Patented April 19, 1904.

UNITED STATES PATENT OFFICE.

DANIEL J. McMAHON, OF TAUNTON, MASSACHUSETTS.

WIRE-DRAWING MACHINE.

SPECIFICATION forming part of Letters Patent No. 757,671, dated April 19, 1904.

Application filed March 4, 1903. Serial No. 146,045. (No model.)

*To all whom it may concern:*

Be it known that I, DANIEL J. MCMAHON, a citizen of the United States, residing at Taunton, in the county of Bristol and State of Massachusetts, have invented an Improvement in Wire-Drawing Machines, of which the following description, in connection with the accompanying drawings, is a specification, like characters on the drawings representing like parts.

This invention has for its object the production of a novel wire-drawing machine which is compact in structure and has few parts and which is easily strung up. The drawing drum or drums are mounted on a swinging frame and are situated eccentric to the axis of the frame.

In the preferred embodiment of my invention a plurality of drawing-drums are used, and the construction is such that the wire passes directly from one drum to the next successive drum without passing over any interposed rollers or idlers. In stringing up the machine the wire is given one or more turns completely around each drum, whereby extra drawing-surface is obtained. To facilitate the stringing-up operation, I have in one embodiment of my invention constructed the frame which supports the drums in two separable parts, and the line of division between said parts is substantially in the plane of the end of the drums. A stringing-up device is employed which is adapted to carry the end of the wire completely around all of the drums one or more times, and after the drums are thus encircled by the wire the frame is separated and the loop or loops of wire slipped off from the end of one drum and made to completely encircle the other drum. This operation is then repeated with respect to the drums alternately, with the result that the wire passes completely around one drum a plurality of times, then passes to the next drum, around which it passes a plurality of times, and is then carried to the next drum, &c. Interposed between each two adjacent drums are a series of drawing-dies, through which the successive coils of wire pass.

Other features of the invention will be more particularly hereinafter described, and pointed out in the claims.

In the drawings, Figure 1 is a side elevation of one form of my improved wire-drawing machine. Fig. 2 is a plan view thereof. Fig. 3 is a plan view of a portion of the machine, showing the swinging frame separated. Fig. 4 is a section through the machine on the line *x x*, Fig. 1. Fig. 5 is a transverse section through the drawing-drums and frame, showing a modification of the invention. Fig. 6 is a detail hereinafter described. Fig. 7 is a view showing the drawing-die and its holder. Fig. 8 is a section through one die-holder, and Figs. 9 and 10 are details hereinafter described.

The stand or frame upon which the operative parts are mounted is designated generally by 3 and may be of any suitable construction adapted to support the parts. The swinging frame which carries the drawing drum or drums is designated by 4, and it is mounted to turn or swing about the driving-shaft 5 as an axis.

In the embodiment of my invention shown in Figs. 1 to 4 I have illustrated the frame 4 as carrying two drawing-drums 6 and 7, respectively, these drums being revolubly mounted in the frame eccentrically to the axis thereof. As herein shown the shafts 8 and 9, on which said drums are rigidly mounted, have fast thereto gears 10 and 11, respectively, and said gears mesh with a driving-gear 12, fast on the driving-shaft 5. The rotation of the driving-gear 12 thus operates to rotate the drums in the same direction. In this embodiment of my invention the frame 4 is made in separable parts. One part comprises the portion 13, in which the shafts 5 8 9 are mounted, and the central portion 14, which is situated between the drums and in which the dies are supported, and the other part of the frame is designated by 15 and is provided with a pivotal shaft 16, which is journaled in the frame and has short shafts 17 and 18, which are in alinement with and constitute, in effect, extensions of the drawing-drum shafts 8 and 9, respectively. The portion 15 of the frame carries the stringing-up device, which comprises a grip mechanism adapted to carry the end of a wire about all of the drums.

The grip mechanism is designated by 19 and comprises a pincer-like device which is mounted on a sprocket-chain 20, which passes over suitable sprockets-wheels 21 22, carried on the shafts 17 and 18, respectively.

Preferably the shafts 8 and 17 and 9 and 18, respectively, will be constructed to be interlocked together, one convenient way of doing this being to provide the shafts 8 and 9 with axial sockets, in which projections 24 on the shafts 17 and 19 project.

The portion 15 of the frame is constructed to be moved toward and from the other portion of the frame, or from the position shown in Fig. 2 to that shown in Fig. 3, this being accomplished by slidably mounting the shaft 16 in its bearings.

When the two parts of the frame are closed together, as shown in Fig. 2, the part 15 is held in such position by means of a removable key-piece 30, which is adapted to be set over the shaft 16 between the portion 15 and the main frame 3, as shown in Figs. 2 and 4. Said key-piece is shown as a U-shaped member having the guide-ribs 31, which are adapted to play in suitable ways in the lugs 33 on the frame 3.

Suitable means are provided for driving the sprocket-wheels 21 and 22 from one or both of the drums, and for this purpose I have provided the sprocket-wheel 21 with a ratchet portion 93, rigid therewith, and the drum 6 with a pawl 94, which is constructed to engage said ratchet when the two parts of the frame are closed together as seen in Fig. 9. The pawl and ratchet are so arranged that the forward rotation of the drum drives the sprocket-wheel and chain; but the said sprocket-chain can be pulled forward independently of the drums, if desired.

A pawl-and-ratchet connection may be employed between any individual drum and the corresponding sprocket-wheel or between all the drums and the sprocket-wheels, as desired. Any other suitable connection between the drums and sprocket-wheels may be employed in place of the pawl-and-ratchet connection without departing from my invention.

The portion 14 of the frame is illustrated as being provided with one or more die-holder-receiving grooves 35, in which the die-holders are placed. Preferably the die-holders will be of the construction shown in Fig. 7, each having a base portion 36 to fit the groove 35, and the fingers 37, against which the die 38 rests. Preferably the fingers will be rigidly united by the web 39 and will be swiveled to the base 36, as shown in Fig. 8. To hold the dies in place, each of the die-holding fingers may be recessed, as at 40. (See Fig. 7.)

Where two drawing-drums are employed, as shown in Figs. 1 to 4, a die-holder-receiving groove 35 is formed in each side of the portion 14, as seen in Fig. 1.

The method of stringing up this machine is as follows: A die is placed at the open end of the groove 35 in substantially the position shown by the die $a$ in Fig. 2, and the end of the wire is inserted through the die and led to the grip device 19. If with the parts in the position shown in Fig. 2 the driving-shaft 5 is rotated, the drawing-drums will be rotated through the gearing 10 11 12, and the sprocket-wheels 21 22 will also be rotated, because of the pawl-and-ratchet connection between the drum 6 and sprocket-wheel 21. The grip device at the end of the wire will therefore be carried around both of the drums. When the grip device has made one or more complete rotations, the key-piece 30 will be removed and the parts of the frame opened, as shown in Fig. 3. The loop or loops of wire which have been formed about the two drums will then be slipped off from the free end of the drum 6, but left still encircling the drum 7. After the loop or loops have thus been slipped off from the free end of the drum 6 that portion thereof which passes about the said drum 6 is passed between the drum 7 and the central portion 14 of the frame, so that these enlarged loops encircle the drum 7 only. The slack in the loops is now taken up, so as to draw the wire tightly about the drum 7, and the position of the frame carrying the drums is reversed, so as to carry the drum 6 into the right-hand position, Figs. 1 and 2, and to carry the groove 35 which is beneath the portion 14 in Fig. 1 to the upper side thereof. The two parts of the frame may then be closed together, as shown in Fig. 2, and the key-piece inserted and a die-holder slipped into the upper groove 35 and the end of the wire threaded through the die supported thereby and led to the grip device. By repeating the above operations the wire may be caused to completely encircle the drum 6, which, it will be remembered, at such time is in the position occupied by drum 7 in Fig. 2. By repeating this operation the wire may be carried completely around each of the drums in succession, and each of the stretches of wire between either side of the drums may pass through a drawing-die.

In the form of the invention shown in Figs. 1 to 4 there are two drawing-drums, and two series of dies may be employed, if desired. It will be noticed that the wire completely encircles and passes one or more times around each drawing-drum before it extends to the next drum, and as a result a very large amount of drawing-surface is provided. In the drawings I have merely shown the drums in a conventional way and as being cylindrical, so as to avoid confusion.

Any suitable means may be employed to lock the swinging frame in its desired position during the drawing operation, and I have herein shown a ratchet-wheel 41 fixed on the shaft 16 and with which two oppositely-disposed pawls 42, carried by the framework, coöperate. When the pawls are thrown into the position shown in Fig. 1, they operate to lock the portion 15 of the frame from turning in either direction. The portion 13 of the frame may be locked in its operative position by any suitable device. I have shown a ratchet-wheel 96 fixed to the main frame 3 and two oppositely-disposed pawls 97 carried by the swinging frame 13 and constructed to engage said ratchet. This construction has the advantage that it serves to lock the frame in any desired angular position. As the wire leaves the drawing-drums it passes through a die 50, carried by a holder mounted in a groove 51 in the frame 3, and then around the usual block 52.

Any suitable mechanism may be employed for rotating the shaft 5. As herein shown I have provided a gear 60, fast to said shaft and meshing with a gear 61, carried by a countershaft, said shaft being connected by gears 62 and 63 with the shaft 64, carrying a belt-pulley 65. Any other convenient driving mechanism, however, may be substituted for the one shown. It will be noted that the shaft 5 is journaled in bearings in the side of the frame 3 and that the drums and gears 10 11 overhang said bearing. To steady the shaft, the outer end is supported in a suitable bearing 98, which will be situated far enough from the frames so that the shaft will be held steady. The block is shown as being mounted on a vertical shaft journaled in suitable bearings 70 and having at its lower end a bevel-gear 71, which meshes with a coöperating gear on a shaft 72, said shaft having a gear 73 thereon which meshes with a gear 74 on the shaft-carrying gears 62 61. I will preferably connect the block 52 to its shaft by a pawl-and-ratchet mechanism 80, whereby the block may be manually turned ahead of the shaft if such action is necessary to take up any slack in the wire.

83 designates a direction or guide roller around which the wire passes as it leaves the last die 50. Said direction-roller is mounted in one of the grooves 51, and hence can be adjusted so as to be in exact alinement with the die 50. The object of this roller is to permit different-sized blocks 52 to be used, and yet to provide means whereby the wire as it leaves the die 50 will be maintained in a straight line. Any suitable means may be employed for clamping this roll in the desired position in the groove 51.

In order to prevent the sprocket 20 of the chain from being pulled off the sprocket-wheels by the lateral pull on the pincer mechanism as it is carrying the wire around the drums in the stringing-up operation, I will preferably provide a suitable guard 84, which extends along the inside of said chain and is provided with feet 85, which are secured to the portion 15 of the frame.

86 designates a suitable tank or receptacle adapted to contain lubricating material. The tank is preferably removably and adjustably supported by the frame 3. As illustrated, it is supported on cam members 86', carried by shafts 87, which are connected togther by suitable gearing 88. By rotating the gears the cams are carried from the full into the dotted line position, Fig. 1, or vice versa, thus providing means for raising or lowering the tank 86. When the tank is in its lowered position, it may be removed, as shown in dotted lines. To keep the lubricant material cool, I will preferably provide said tank with a jacket 89, through which water may be circulated, the water taken into the jacket through an inlet 91 and being carried away from said jacket through a suitable pipe 90.

103 designates a movable gate, which may be employed to close the open end of the groove 35 to prevent the die-holders from being pulled out of it. This may be in the form of a member pivoted to the portion 14, so that it can be swung across the end of the groove or out of alinement with the groove.

In the embodiment of my invention thus far described I have illustrated a frame carrying two drawing-drums only. My invention, however, would not be departed from if any number of drawing-drums were supported by the frame.

In Fig. 5 I have illustrated how the frame can be made to support three drawing-drums. In this embodiment of my invention the central portion 14' is shaped substantially as shown in Fig. 5, and the drawing-rolls 8', 9', and 94 are positioned as shown. Each of the drawing-drums have rigid therewith gears 10', 11', and 95, which mesh with and are driven by a gear 12' upon the shaft 5. The gears are shown by dotted lines in Fig. 5. In this embodiment of my invention there are three series of dies, each series being supported in a groove 35 between two adjacent drawing-rolls.

It will be obvious from the above description that by simply changing the shape of the central portion of the frame any number of drawing-drums could be employed, it being understood that each drawing-drum would have a gear rigid therewith which would mesh with a gear fast to the driving-shaft 5.

I consider the idea of mounting two or more drawing-drums eccentrically in a pivoted frame as a very important one, because it enables me to build a machine of large capacity very compactly.

By employing two or more drums which are situated eccentrically to the axis of the swinging frame and providing the frame with grooves both in its top and bottom it is possible to pass each stretch of the wire extending between the two drums through a die. Where two drawing-drums are used, two sets of dies may be employed, or twice as many dies as if one of the drawing-drums was merely an idler and the frame a rigid frame, and where three drawing-drums are employed, as in Fig. 5, three different sets of dies may be employed, &c. It is possible, therefore, to obtain much greater drawing capacity with a machine constructed with the swinging frame and the drums mounted eccentrically to the axis of the frame than is possible with the ordinary style of drawing-machine.

In the above-described forms of my invention the frame supporting the drawing-drums is made in separable parts, and the stringing-up device is constructed to carry the end of the wire completely around all of the drums.

It is not essential that the frame be made in separable parts, as by employing a different form of stringing-up device from that herein illustrated the wire may be made to encircle each of the drawing-drums a plurality of times even though the drums are mounted in a one-piece frame.

In Fig. 10 I have illustrated a structure in which each drawing-drum has at one end and loose upon its shaft, so as to rotate relative thereto, a rotatable member 110, which carries a grip device 111. Such a rotatable member will be mounted upon the shaft of each of the drums, and these members combined take the place of the sprocket-chain and grip device illustrated in Figs. 1 to 4. In this form of my invention the wire will be taken through one of the dies occupying the position $a$ in Fig. 2 and then grasped by the grip device corresponding to, say, drawing-roll 7. The grip device is connected to the drawing-roll by suitable pawl-and-ratchet mechanism 112 and 113, so that the forward rotation of the drawing-drum will rotate the member. As the drawing-drum is thus operated the end of the wire is carried around the drum 7 one or more times, as desired. Consequently the end of the wire is released from the grip device and after the frame has been reversed in position taken through a second die and to the rotatable member corresponding to the next drawing-drum and carried by the grip device of said member around the latter drawing-drum one or more times, as desired. The frame may then be reversed again and the operation repeated with reference to the first drawing-drum, or if the frame carries three or more drawing-drums the same operation will be repeated with reference to the third drawing-drum. In order to obtain the best results, the wire during its passage through the dies should extend in a direction exactly perpendicular to the dies.

I have herein illustrated the portion 14 of the frame as having supplemental grooves 35ª, in which are mounted stands carrying direction-rolls 83ª. By adjusting these rolls at proper places in the grooves the wire may be held in its right line movement while passing through the dies.

Although I have illustrated the tank 86 as being removable in Fig. 1, yet my invention would not be departed from if the tank were not removable. Where the form of the invention shown in Fig. 5 is being employed, I may construct my tank with its side walls as high as or even above the axis of the drawing-rolls 8' 9', in which case the main shaft 5 would extend through stuffing-boxes in the sides of the tank. With a tank of this depth the machine may be properly lubricated.

The principal feature of my invention is a construction in which the drawing-drums are mounted upon a swinging frame, so that the drums and frame may be reversed. This I consider as very important, as it enables me to facilitate greatly the stringing-up operation.

It will be obvious that many other changes than those suggested might be made in the details of the various parts of the machine without in any way departing from the spirit of my invention as expressed in the appended claims.

Having described my invention, what I claim, and desire to secure by Letters Patent, is—

1. In a wire-drawing machine, a frame mounted to turn about its axis and having a plurality of faces in different planes, a plurality of drawing-drums revolubly mounted in said frame, and drum-rotating mechanism, said frame having means to support a die on each of its faces.

2. In a wire-drawing machine, a frame mounted to turn about its axis and having a plurality of faces in different planes, a plurality of drawing-drums revolubly mounted in said frame, drum-rotating mechanism, and a plurality of series of dies carried by the frame, a series of dies being situated on each face thereof.

3. In a wire-drawing machine, a frame comprising separable parts, a plurality of drawing-drums revolubly mounted in one part of said frame, a stringing-up device carried by the other part of said frame, drum-rotating mechanism, and dies carried by said frame, the line of separation between the parts of the frame being so situated that when the parts are separated the ends of the drums are exposed.

4. In a wire-drawing machine, a two-part revoluble frame, a drawing-drum mounted in one part of said frame, the other part of the frame having bearings for the end of the drum which bearings are withdrawn from the drum when the frame is separated so as to leave the end of the drum exposed, a stringing-up device, and dies carried by said frame on each side of said drum.

5. In a wire-drawing machine, a two-part revoluble frame, dies carried thereby, a drawing-drum mounted in one part of said frame, and a stringing-up device carried by the other part of said frame, the line of separation between the two parts of the frame being substantially at the end of the drawing-drum whereby in stringing up the machine the wire may be wound about said drum a plurality of times between successive dies.

6. In a wire-drawing machine, a revoluble frame comprising two separable parts, a plurality of drawing-drums, and drum-rotating mechanism carried by one part of said frame, and a stringing-up device carried by the other part of said frame, the plane of separation between the two parts of the frame being substantially in the plane of the end of the drums.

7. In a wire-drawing machine, a revoluble frame comprising two separable parts, a plurality of drawing-drums, drum-rotating mechanism, and a plurality of series of dies carried by one part of said frame, and a stringing-up device carried by the other part of said frame, the plane of separation between the two parts of the frame being substantially at the ends of the drums.

8. In a wire-drawing machine, a revoluble frame comprising two separable parts, a plurality of drawing-drums, and drum-rotating mechanism, carried by one part of said frame, and a stringing-up device carried by the other part of the frame and comprising a grip mechanism, and means to carry the latter about all of the drums.

9. In a wire-drawing machine, a plurality of drawing-drums, die-carrying means having dies supported thereby, a grip mechanism, and means to move said grip mechanism about all of the drums, whereby the end of the wire to be drawn may be threaded through one die and then caused by said grip mechanism to encircle the drums.

10. In a wire-drawing drum, a frame comprising two separable sections, a plurality of drawing-drums carried by said frame, dies also supported by the frame, a grip mechanism, and means to move the grip mechanism about the drums, the line of separation between the two parts of the frame being substantially at one end of the drums whereby the loop of wire which is carried about both of the drums by the grip mechanism may be slipped off from the end of one of the drums when the frame is separated.

11. In a wire-drawing machine, a frame comprising separable parts, a plurality of drawing-drums carried by one section of said frame, dies also carried by the frame, a sprocket-chain passing around the drums and carried by the other section of the frame, a grip mechanism carried by said chain, means to connect the chain to one of the drums whereby the rotation of said drum will carry the grip mechanism about said drums.

12. In a wire-drawing machine, a driving-shaft having a driving-gear thereon, a frame movable about said shaft as an axis, a drawing-drum carried by said frame and situated eccentric to the driving-shaft, gears connecting said driving-gear and driving-drum, and dies carried by the frame.

13. In a wire-drawing machine, a driving-shaft having a driving-gear thereon, a two-part frame revoluble about said shaft, a drawing-drum carried by one part of said frame and situated eccentric to the driving-shaft, gears connecting said driving-gear to the drawing-drums, dies carried by said first part of the frame, and a stringing-up device carried by the other part of the frame.

14. A die-holder having vertical recessed fingers, and a die adapted to be received loosely in the recess in said fingers and held against displacement in a vertical direction by the walls of the recess.

15. In a wire-drawing machine, a frame having a dovetail groove, a series of individual die-holders slidably sustained in said groove and each having a base shaped to fit the groove, and vertical fingers rigidly secured together but swiveled to said base portion.

16. In a wire-drawing machine, a frame having a dovetail groove, a series of individual die-holders slidably sustained in said groove, and each having a base shaped to fit the groove, and vertical fingers rigidly secured together but swiveled to said base portion, each finger having an open recess to receive a die which is held against vertical movement by the walls of said recess.

17. In a wire-drawing machine, a die, means to draw the wire therethrough, a block, block-rotating mechanism, and a pawl-and-ratchet connection between the block and its rotating mechanism.

In testimony whereof I have signed my name to this specification in the presence of two subscribing witnesses.

DANIEL J. McMAHON.

Witnesses:
 ERNEST L. CAHOON,
 BENJAMIN MORRIS.